United States Patent
Matsuda et al.

[11] Patent Number: 6,125,324
[45] Date of Patent: Sep. 26, 2000

[54] VEHICLE CONTROL APPARATUS

[75] Inventors: Shohei Matsuda; Makoto Otabe; Yuji Sakaki, all of Saitama, Japan

[73] Assignee: Honda Giken Kogyo Kabushiki Kaisha, Tokyo, Japan

[21] Appl. No.: 09/056,242

[22] Filed: Apr. 7, 1998

[30] Foreign Application Priority Data

Apr. 9, 1997 [JP] Japan ................................. 9-091174

[51] Int. Cl.$^7$ ................................................ G06F 165/00
[52] U.S. Cl. ......................... 701/208; 701/213; 701/300
[58] Field of Search .................................. 701/1, 70, 72, 701/93, 200, 208, 213, 300

[56] References Cited

U.S. PATENT DOCUMENTS

| | | |
|---|---|---|
| 5,539,397 | 7/1996 | Asanauma et al. ..................... 340/901 |
| 5,546,311 | 8/1996 | Sekine . |
| 5,661,650 | 8/1997 | Sekine et al. . |
| 5,748,476 | 5/1998 | Sekine et al. ............................ 701/93 |

FOREIGN PATENT DOCUMENTS

| | | |
|---|---|---|
| 4314826 | 11/1994 | Germany . |
| 8-147598 | 6/1996 | Japan . |
| 19543551 | 5/1996 | United Kingdom . |

*Primary Examiner*—William A. Cuchlinski, Jr.
*Assistant Examiner*—Edward Pipala
*Attorney, Agent, or Firm*—Carrier, Blackman & Associates, P.C.; Joseph P. Carrier; William D. Blackman

[57] ABSTRACT

A vehicle control apparatus is operative so as to prevent a chattering of initiation and termination of vehicle control, such as automatic deceleration, on the basis of a variation in a predicted passing speed. The apparatus comprises a maximum passable speed calculating mechanism M5 which calculates a maximum passable speed of a forward curve ahead of the vehicle on the basis of a road shape determined by a road shape decision mechanism M11, and a predicted passing speed calculating mechanism M7 calculates a predicted passing speed for the forward curve on the basis of a vehicle speed detected by a vehicle speed detector M6. The maximum passable speed includes a control initiation speed and a control termination speed larger than the control initiation speed, and a passage-possible/impossible determining mechanism M8 initiates operations of a warning mechanism M9 and a vehicle speed regulating mechanism M10 if the predicted passing speed exceeds the control initiation speed, and terminates the operations of the warning mechanism M9 and the vehicle speed regulating mechanism M10 if the predicted passing speed falls below the control termination speed.

15 Claims, 12 Drawing Sheets

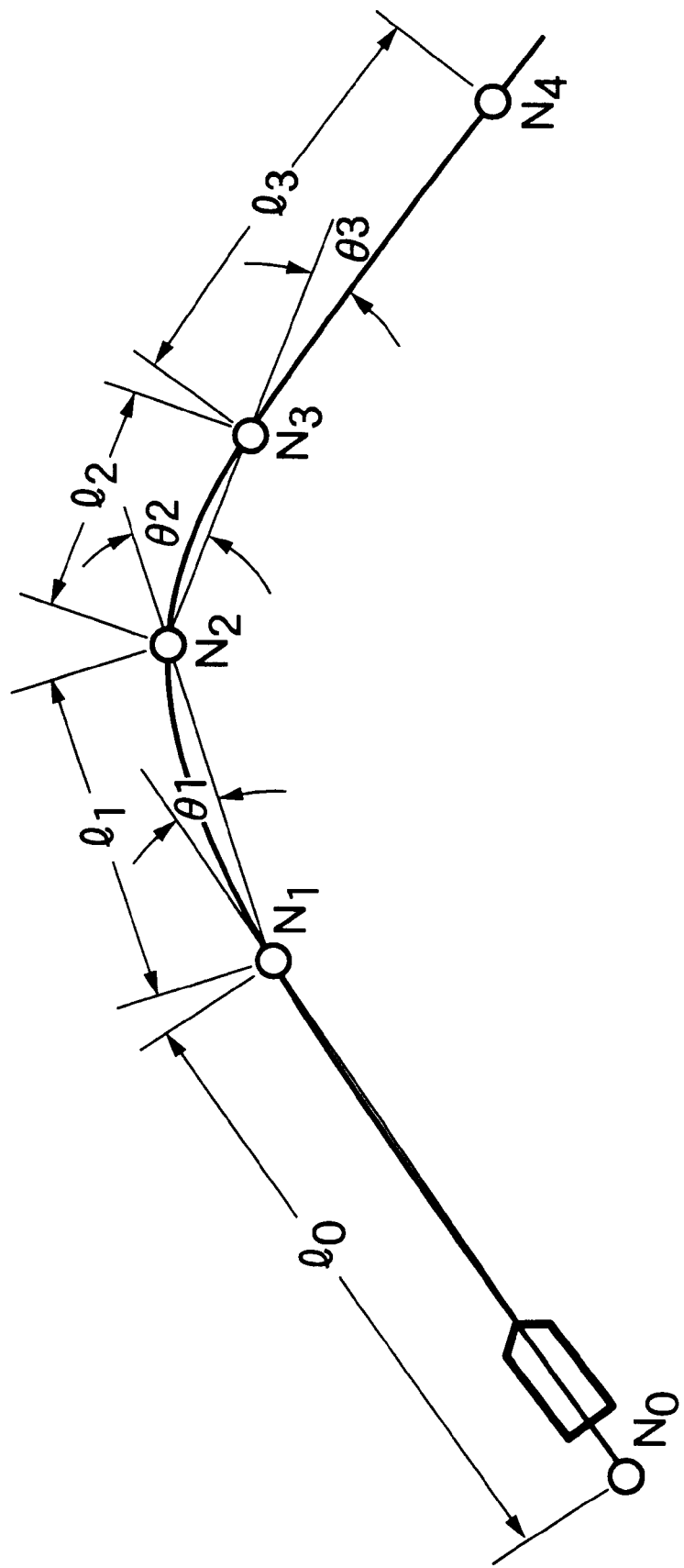

VEHICLE CONTROL APPARATUS

BACKGROUND OF THE INVENTION

1. Field of the Invention

The present invention relates to a vehicle control apparatus which recognizes a road shape on the basis of map data including a group or a plurality of nodes which represent a road and determines whether a vehicle can safely pass different ones of the nodes, on the basis of the recognized road shape.

2. Description of the Relevant Art

In the field of such vehicle control apparatus, Japanese Patent Application Laid-Open No. 8-147598 discloses a known apparatus which, if it is determined that a vehicle cannot pass a curve ahead of the vehicle, first warns a driver to voluntarily decelerate the vehicle, and if it is thereafter determined that the vehicle still cannot pass the forward curve, executes automatic deceleration of the vehicle.

The known apparatus calculates a maximum passable speed at which the vehicle can pass the curve and a predicted passing speed at which the vehicle is presumed to pass the curve given prevailing conditions. If the predicted passing speed exceeds the maximum passable speed, the known apparatus determines that the vehicle cannot pass the curve and initiates vehicle control such as automatic deceleration, and if the predicted passing speed falls below the maximum passable speed, the known apparatus determines that the vehicle can pass the curve and terminates the vehicle control.

However, in the known apparatus, there is a possibility that if the predicted passing speed exceeds or falls below the maximum passable speed at short time intervals owing to a variation in vehicle speed, an undesirable chattering will occur in which an initiation and a termination of the vehicle control are repeated.

SUMMARY OF THE INVENTION

The present invention has been made in view of the above-described disadvantage of the known apparatus, and an object of the present invention is to reliably avoid the chattering of initiation and termination of vehicle control due to a variation in a predicted passing speed.

To achieve the above object, and according to the invention there is provided a vehicle control apparatus which comprises map information output means for outputting map information containing a group of nodes which constitute a road, vehicle position detecting means for detecting a vehicle position on a map, road shape decision means for determining a road shape based on an arrangement of ones of the nodes forward of the vehicle position, maximum passable speed calculating means for calculating a maximum passable speed for each of the ones of the nodes based on the determined road shape, vehicle speed detecting means for detecting a vehicle speed, predicted passing speed calculating means for calculating a predicted passing speed for each of the ones of the nodes based on the detected vehicle speed, passage-possible/impossible determining means for comparing the predicted passing speed with the maximum passable speed and determining whether the vehicle can safely pass each of the ones of the nodes, and vehicle control means for controlling the vehicle based on a result determined by the passage-possible/impossible determining means, the maximum passable speed including a control initiation speed and a control termination speed at least as large as the control initiation speed, and the passage-possible/impossible determining means initiates an operation of the vehicle control means if the predicted passing speed exceeds the control initiation speed, and terminates the operation of the vehicle control means if the predicted passing speed falls below the control termination speed.

In the above-described construction, if the predicted passing speed exceeds the control initiation speed, the operation of the vehicle control means is initiated, whereas if the predicted passing speed falls below the control termination speed, the operation of the vehicle control means is terminated. Since the value of the control initiation speed and that of the control termination speed are made different from each other, it is possible to surely and reliably prevent occurrence of a chattering in which the vehicle control means repeats an initiation of operation and a termination of operation at short time intervals. In addition, since the value of the control termination speed is set larger than that of the control initiation speed, it is possible to prevent a delay of the operation initiation timing of the vehicle control means as well as a delay of the operation termination timing of the vehicle control means.

According to the invention it is preferred that the control termination speed is determined on the basis of the control initiation speed.

In accordance with the above-described construction, it is possible to appropriately associate the operation initiation timing and the operation termination timing of the vehicle control means with each other.

Other objects, advantages and salient advantages of the invention will be apparent from the following detailed description which, when considered in light of the annexed drawings, discloses preferred embodiments of the invention.

BRIEF DESCRIPTION OF THE DRAWINGS

FIG. 7 is an explanatory view of a link length $1_N$ and an intersection angle $\theta_N$ used in the flowchart.

DETAILED DESCRIPTION OF PREFERRED EMBODIMENTS

A mode for carrying out the present invention will be described below by way of presently preferred embodiments shown in the accompanying drawings.

Figure 1:
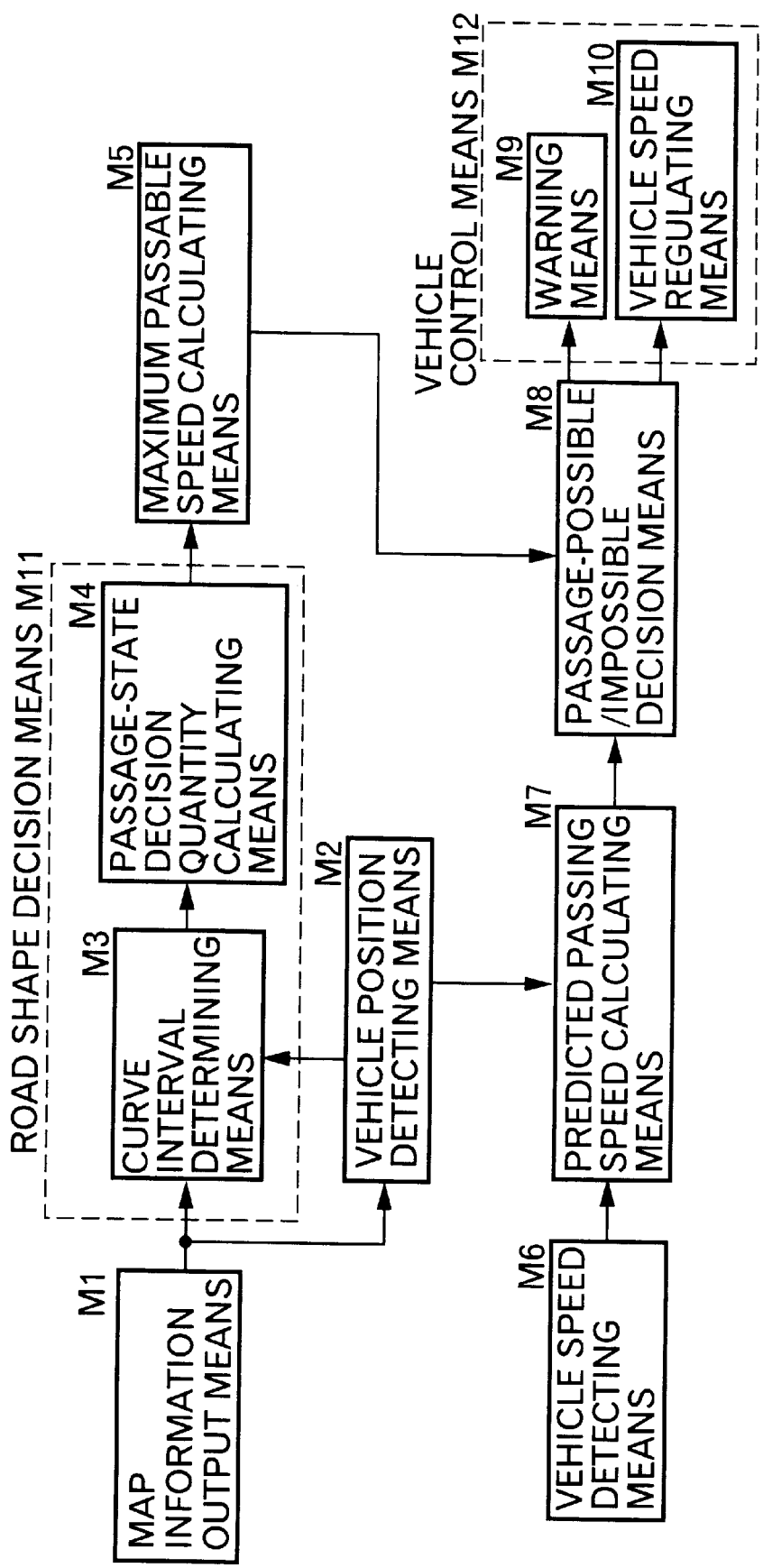
FIG. 1 is a block diagram showing the entire configuration of the apparatus according to a preferred embodiment of the present invention.
Figure 2:
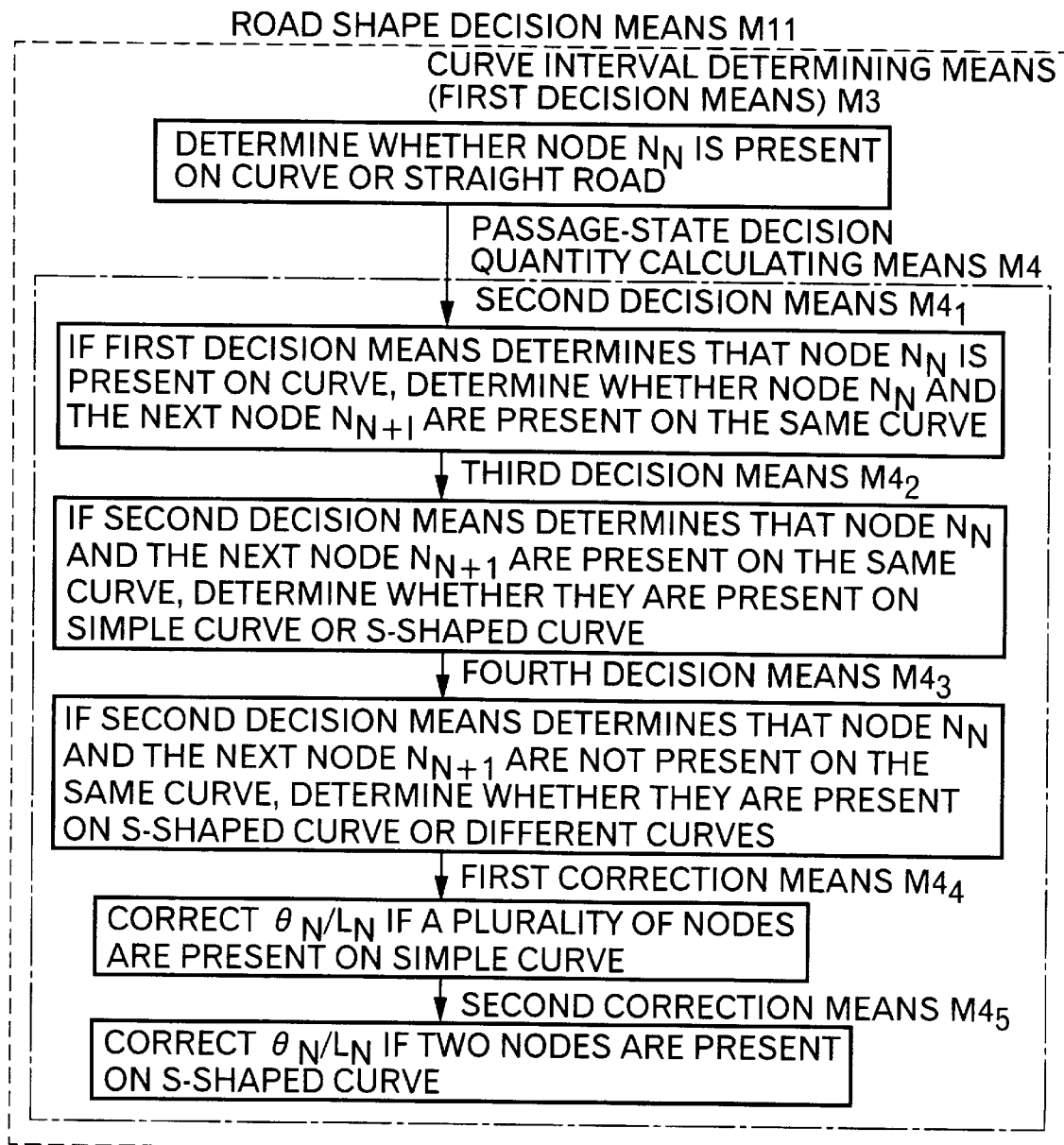
FIG. 2 is an explanatory view of the function of the road shape decision means of FIG. 1.
Figure 3:
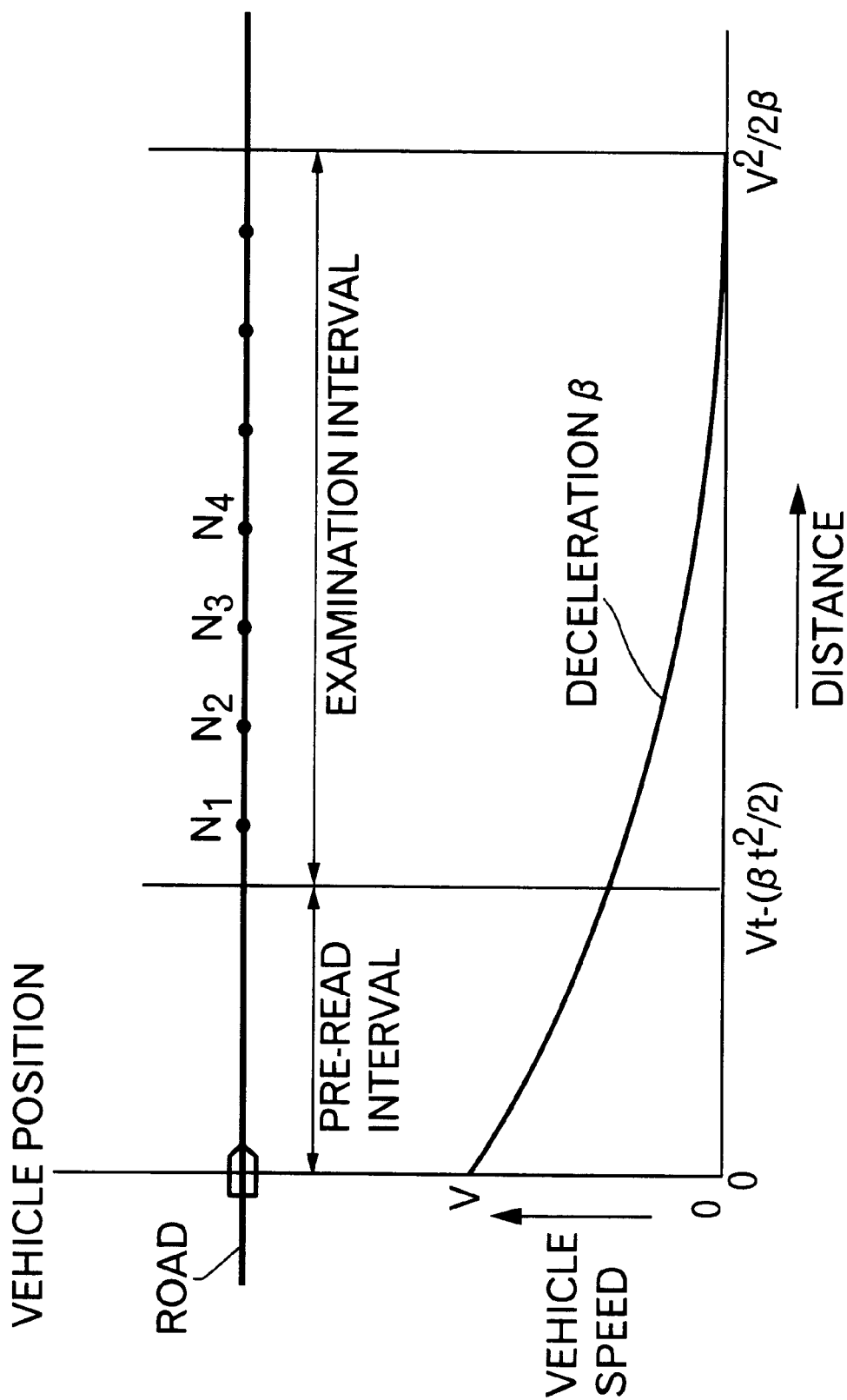
FIG. 3 is an explanatory view of a pre-read interval and an examination interval of FIG. 1.
Figure 4:
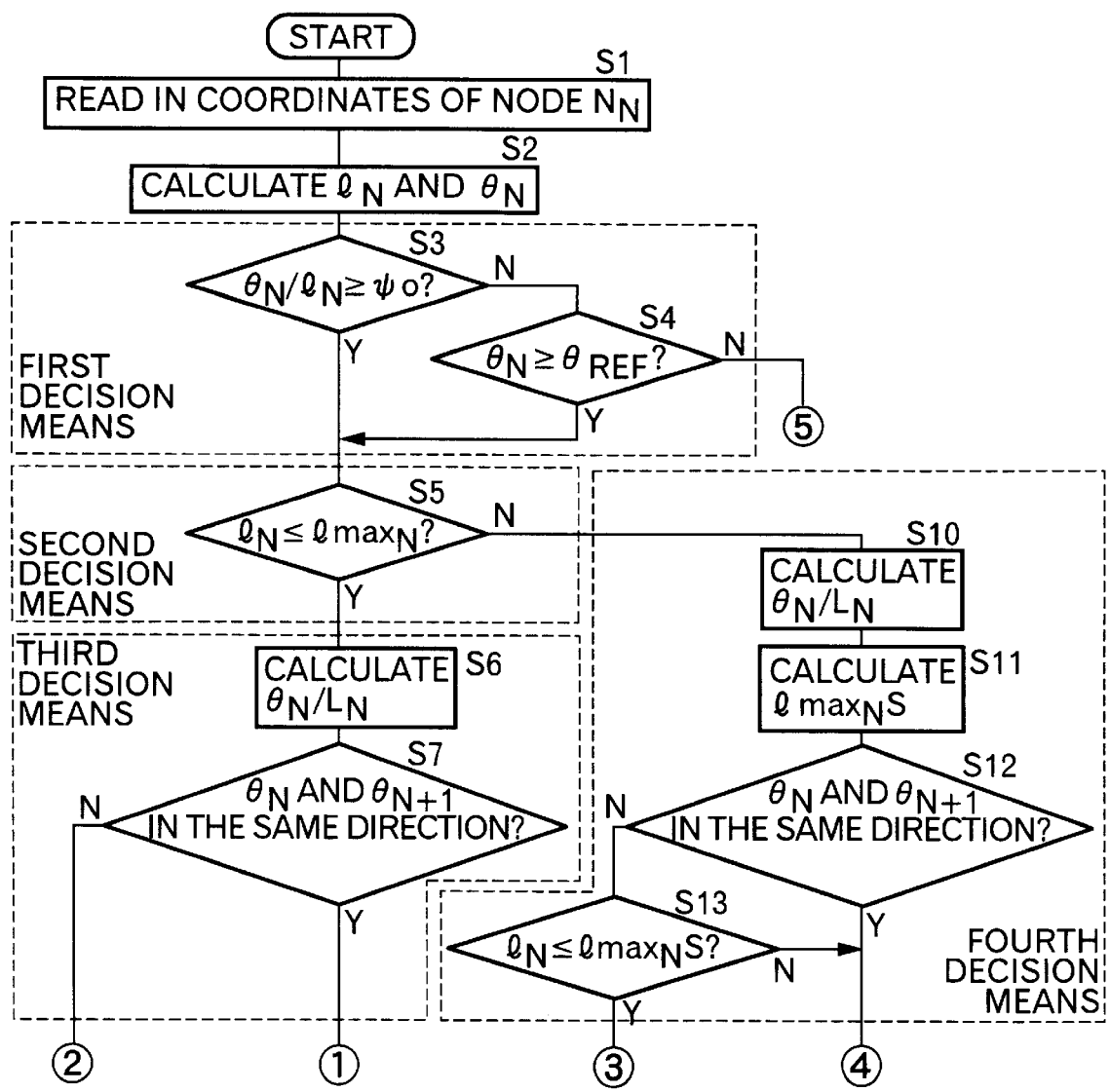
FIG. 4 is a first segmentary view of a flowchart showing the control operation of FIG. 1.
Figure 5:
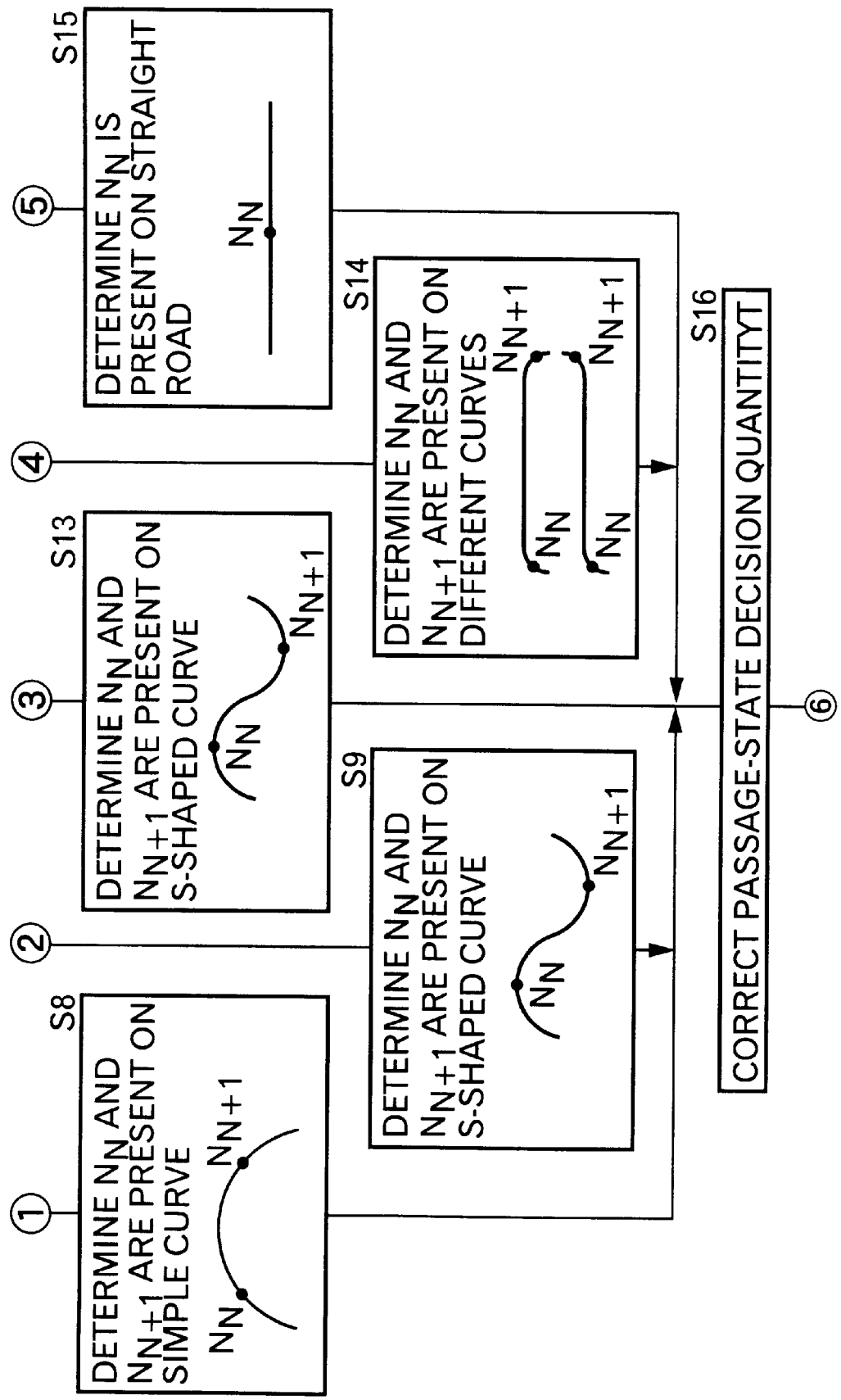
FIG. 5 is a second segmentary view of the flowchart.
Figure 6:
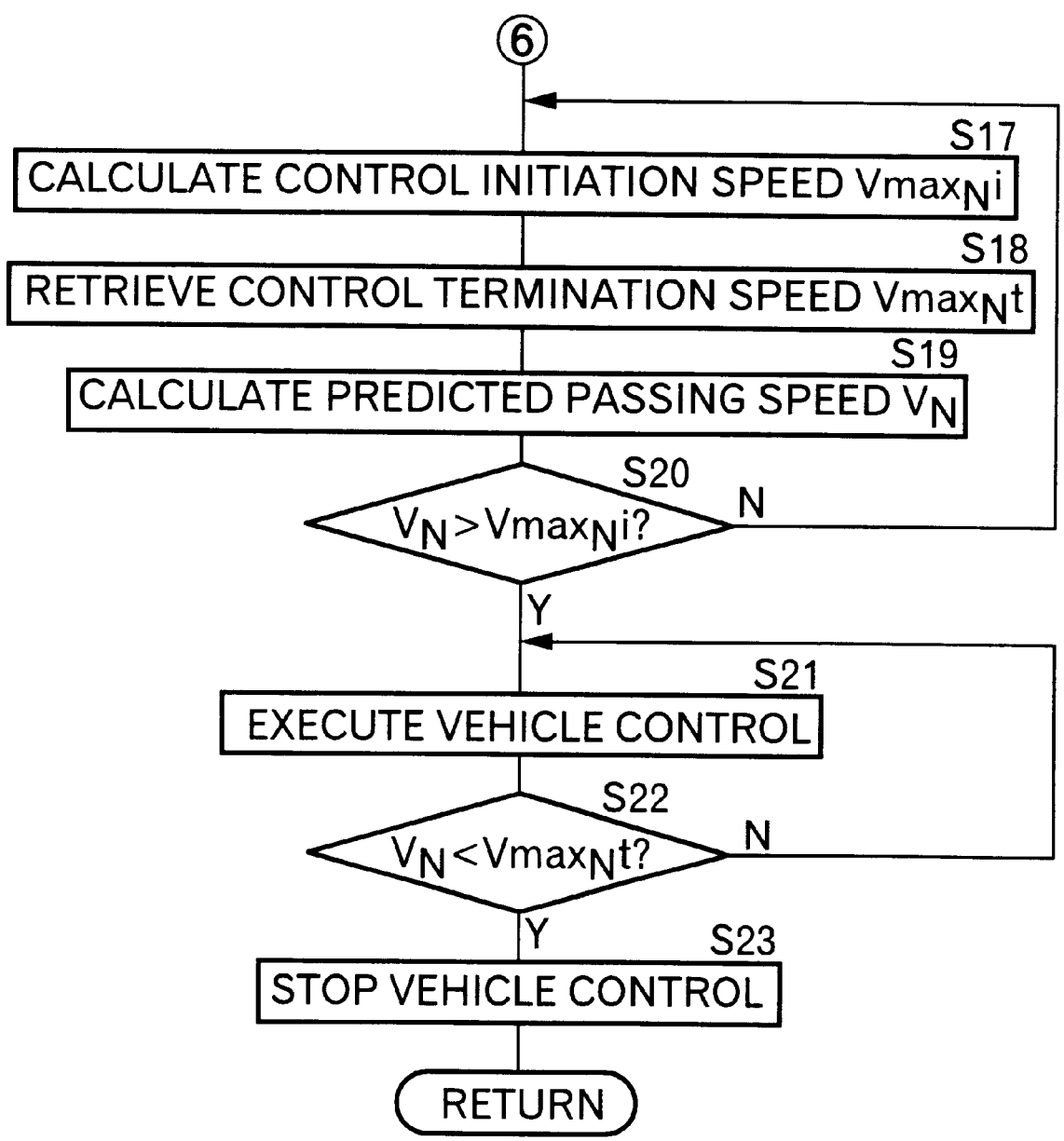
FIG. 6 is a third segmentary view of the flowchart.
Figure 10A:
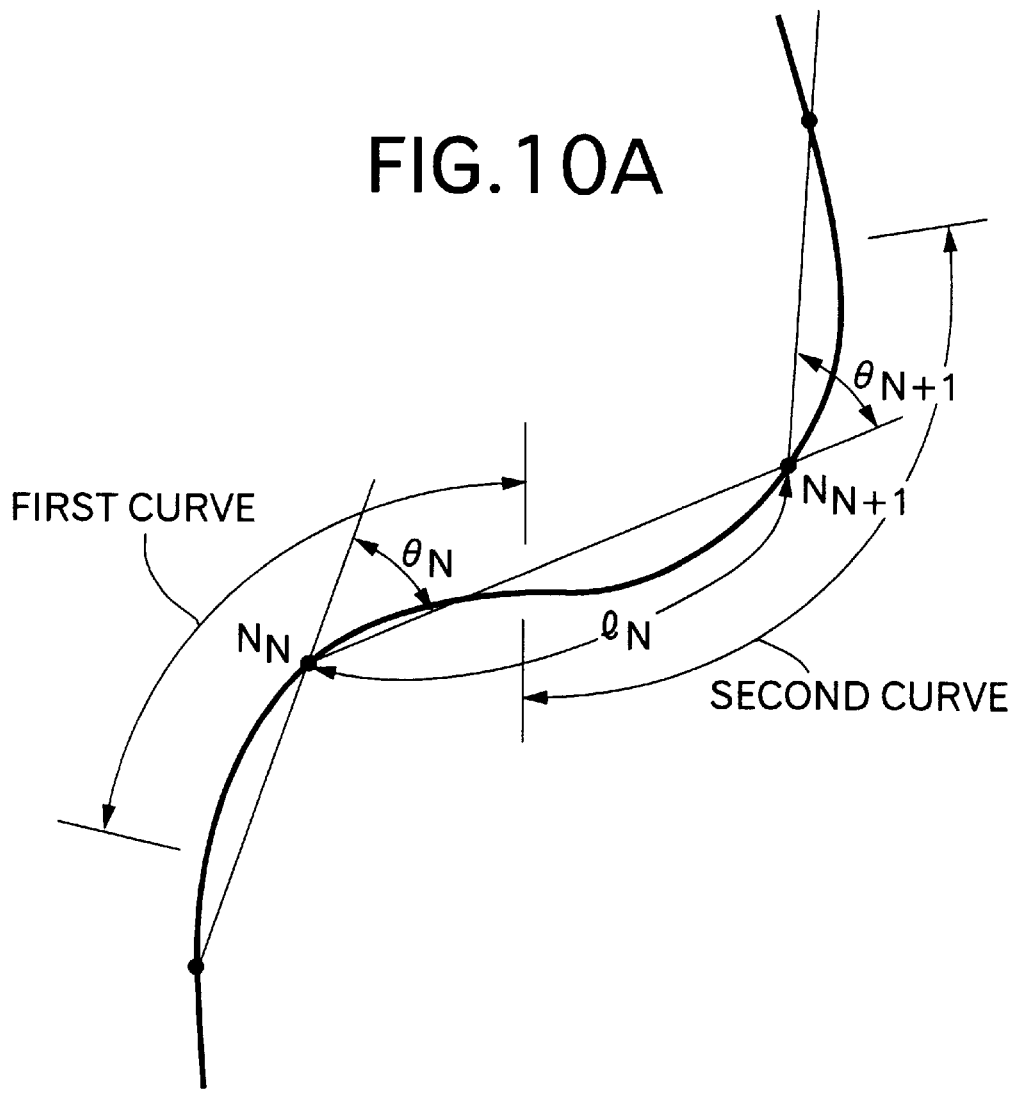
FIGS. 10A and 10B are explanatory views of Step S13 of the flowchart.
Figure 10B:
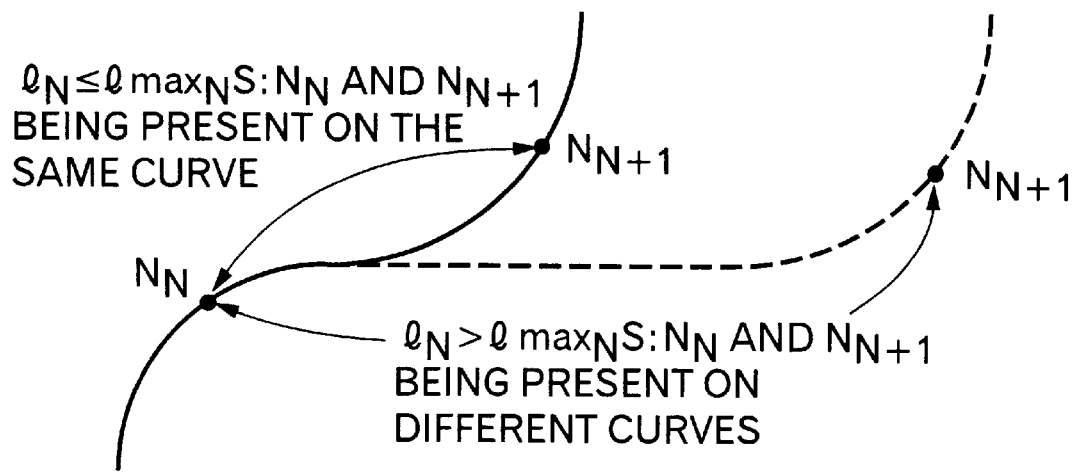
Figure 11A:
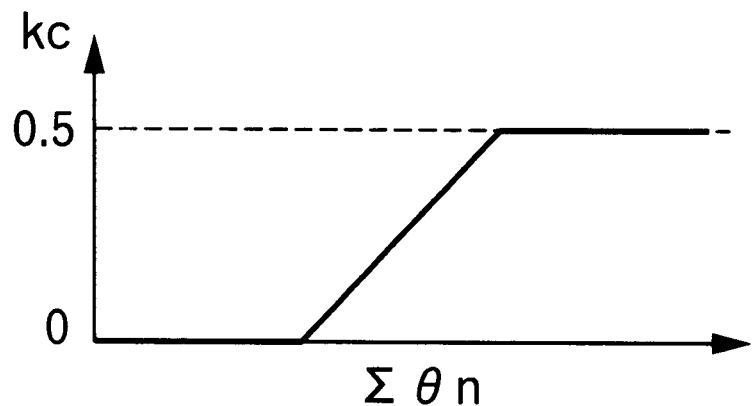
FIGS. 11A and 11B are views showing maps for retrieving the correction coefficients $K_C$ and $K_S$ used in the flowchart.
Figure 11B:
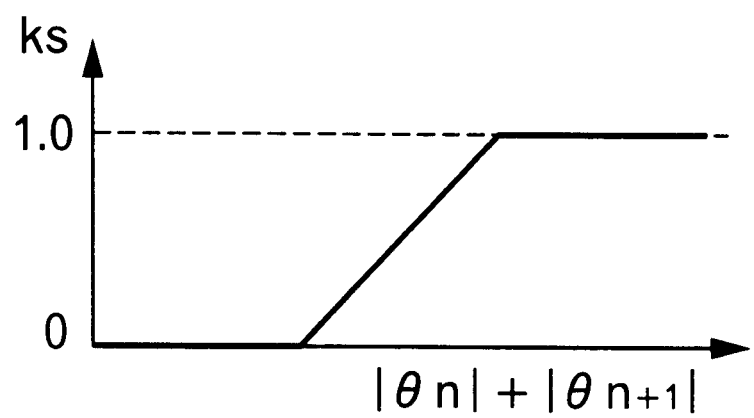
Figure 12:
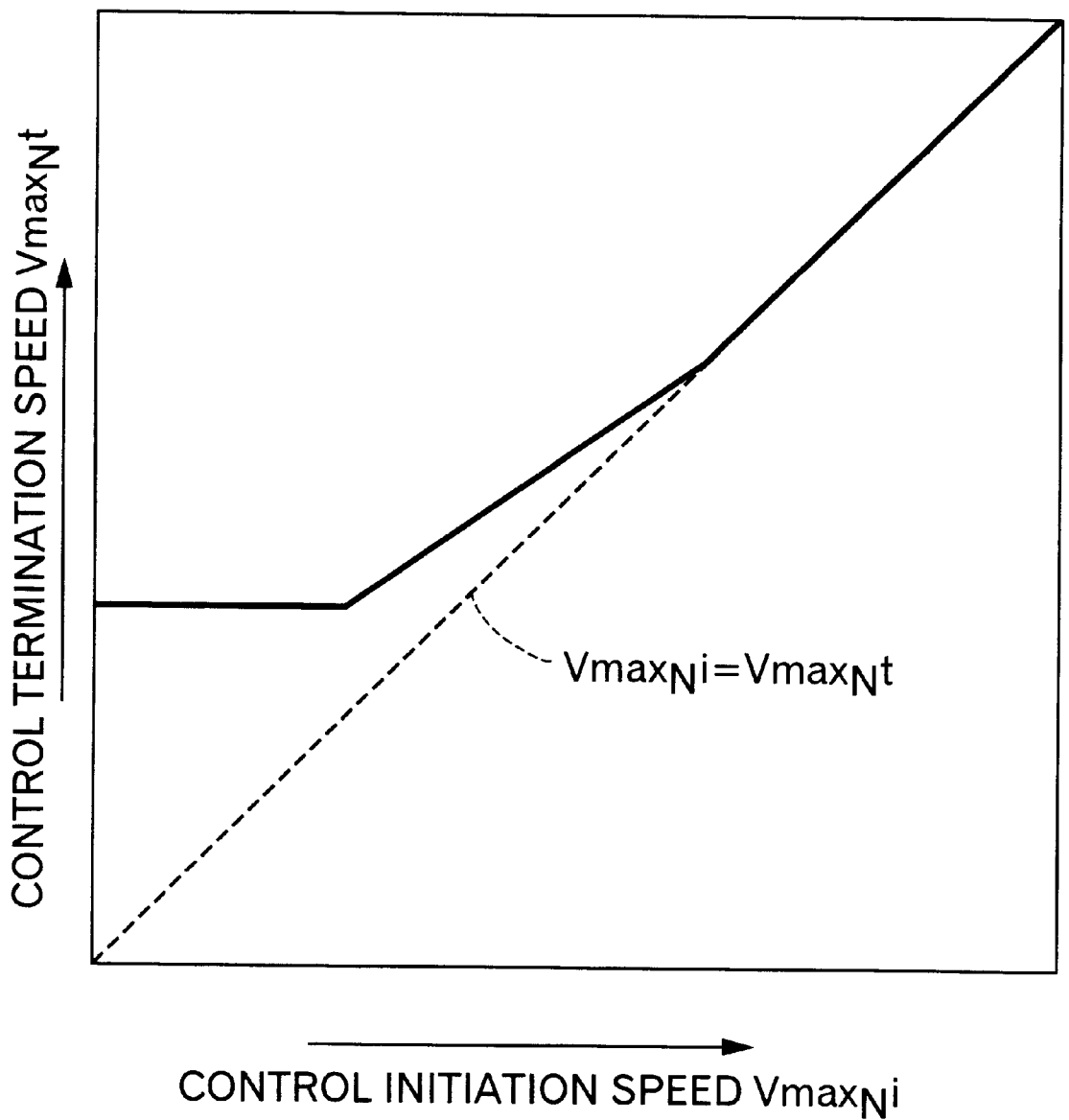
FIG. 12 is a view showing a map for retrieving the control termination speed $V_{maxN}t$ from the control initiation speed $V_{maxN}i$.

FIGS. 1 to 12 illustrate a first preferred embodiment of the present invention, wherein FIG. 1 is a block diagram showing the entire configuration of a vehicle control apparatus; FIG. 2 is an explanatory view of the function of road shape decision means of the apparatus; FIG. 3 is an explanatory view of a pre-read interval and an examination interval; FIG. 4 is a first segmentary view of a flowchart showing control operation of the apparatus; FIG. 5 is a second segmentary view of the flowchart; FIG. 6 is a third segmentary view of the flowchart; FIG. 7 is an explanatory view of a link length $1_N$ and an intersection angle $\theta_N$; FIGS. 8A and 8B are explanatory views of Step S5 of the flowchart; FIGS. 9A, 9B and 9C are explanatory views of the definition of a passage-state decision quantity $\theta_N/L_N$; FIGS. 10A and 10B are explanatory views of Step S13 of the flowchart; FIGS. 11A and 11B are views showing maps for retrieving correction coefficients $K_C$ and $K_S$; and FIG. 12 is a view showing a map for retrieving a control termination speed $V_{maxN}t$ from a control initiation speed $V_{maxN}i$.

As shown in FIG. 1, a control apparatus for a vehicle according to the first embodiment includes map information output means M1, vehicle position detecting means M2, curve interval decision means M3, passage-state decision quantity calculating means M4, maximum passable speed calculating means M5, vehicle speed detecting means M6, predicted passing speed calculating means M7, passage-possible/impossible decision means M8, warning means M9, and vehicle speed regulating means M10. The curve interval determining means M3 and the passage-state decision quantity calculating means M4 constitute road shape decision means M11 in combination, and the warning means M9 and the vehicle speed regulating means M10 constitute vehicle control means M12 in combination.

The map information output means M1 and the vehicle position detecting means M2 are incorporated in a well-known automobile navigation system. The map information output means M1 reads out and outputs road data for a predetermined area which is previously stored in an IC card, a CD-ROM, a rewritable MO (magneto-optical disk) or the like, and the vehicle position detecting means M2 superimposes vehicle position data received at a GPS antenna onto the road data and detects a vehicle position P on a map. The road data is composed of the coordinates of a multiplicity of nodes $N_N$ which are set on roads at predetermined intervals.

As is apparent from FIG. 2 together with FIG. 1, the curve interval decision means M3 which constitutes first decision means determines whether a node $N_N$ forward of the vehicle position P is present on a curve or a straight road, on the basis of the road data and the vehicle position P. The passage-state decision quantity calculating means M4 includes second decision means $M4_1$, third decision means $M4_2$, fourth decision means $M4_3$, first correction means $M4_4$ and second correction means $M4_5$ (the contents will be described in detail later), and calculates a passage-state decision quantity $\theta_N/L_N$ which is an index for determining whether the vehicle can pass the curve.

The maximum passable speed calculating means M5 calculates a maximum passable speed $V_{maxN}$ which is a maximum vehicle speed at which the vehicle can safely pass the node $N_N$, on the basis of the passage-state decision quantity $\theta_N/L_N$ and a preset limit transverse acceleration G (or a set limit yaw rate YR). The maximum passable speed $V_{maxN}$ contains a control initiation speed $V_{maxN}i$ and a control termination speed $V_{maxN}t$, and the maximum passable speed calculating means M5 first calculates the control initiation speed $V_{maxN}i$ by a method which will be described later, and then retrieves the control termination speed $V_{maxN}t$ from the map shown in FIG. 12. As is apparent from FIG. 12, in a region of the high control initiation speed $V_{maxN}i$, the control termination speed $V_{maxN}t$ is set equal to the control initiation speed $V_{maxN}i$, whereas, in regions of the medium or low control initiation speed $V_{maxN}i$, the control termination speed $V_{maxN}t$ is set higher than the control initiation speed $V_{maxN}i$.

The vehicle speed detecting means M6 detects a current vehicle speed V of the vehicle on the basis of the output of a wheel speed sensor provided at each wheel. The predicted passing speed calculating means M7 calculates a predicted passing speed $V_N$ at which the vehicle passes the node $N_N$, on the basis of the vehicle speed V, the vehicle position P and a preset reference deceleration P for the vehicle. The passage-possible/impossible decision means M8 compares the predicted passing speed $V_N$ with the control initiation speed $V_{maxN}i$ when the vehicle control means M12 is inoperative, and, if $V_N \leq V_{maxN}i$, determines that the vehicle can safely pass the node $N_N$. If $V_N > V_{maxN}i$, the passage-possible/impossible decision means M8 determines that the vehicle cannot easily pass the node $N_N$, and operates the warning means M9 including a buzzer or a lamp for warning a driver to decelerate the vehicle, and also operates the vehicle speed regulating means M10 including automatic braking means or engine output reducing means for automatically decelerating the vehicle.

The passage-possible/impossible decision means M8 compares the predicted passing speed $V_N$ with the control termination speed $V_{maxN}t$ when the vehicle control means M12 is in operation, and, if $V_N \geq V_{maxN}t$, determines that the vehicle cannot easily pass the node $N_N$, and continues the operation of the vehicle control means M12. Then, if $V_N < V_{maxN}t$ is reached, the passage-possible/impossible decision means M8 determines that the vehicle can now safely pass the node $N_N$, and terminates the operation of the vehicle control means M12.

As shown in FIG. 3, a pre-read interval and an examination interval are set forward of the vehicle position P along a road. The pre-read interval is set between the vehicle position P and the node $N_N$ for which the apparatus will determine whether the vehicle can safely pass. A predetermined time t is ensured before the vehicle passes through the pre-read interval and reaches the node $N_N$, and within the predetermined time t, whether the vehicle can safely pass is determined, and the warning means M9 and the vehicle speed regulating means M10 are operated. As to each node $N_N$ present within the examination interval, the apparatus of the invention individually, successively determines whether the vehicle can pass the node $N_N$, whereby it is possible to avoid making an unnecessary decision as to whether the vehicle can pass too distant a node $N_N$.

The pre-read interval is determined by a distance $Vt-(\beta t^2/2)$ to be travelled by the vehicle within the predetermined time t, on the basis of the preset reference deceleration $\beta$ which is presumed to be produced by braking if it is assumed that the driver voluntarily starts the braking at the vehicle position P in order to pass a forward curve. The starting point of the examination interval is set at the terminating end of the pre-read interval, and the terminating end of the examination interval is set to a stop position of the vehicle which decelerates at the reference deceleration $\beta$, i.e., a position away from the vehicle position P by a distance $V^2/2\beta$.

The operation of the preferred embodiment of the present invention will now be described with reference to the flowchart shown in FIGS. 4 through 6.

First, in Step S1, coordinates of a plurality of nodes $N_N(N_N=N_1, N_2, N_3, \ldots)$ lying within the examination interval are read in, and in Step S2, a link length $1_N$ and an intersection angle $\theta_N$ at each of the nodes $N_N$ are read in. As shown in FIG. 7, the link length $1_N$ is defined as a distance between adjacent nodes $N_N$ and $N_{N+1}$, and the intersection angle $\theta_N$ is defined as an angle made by a particular link $N_{N-1}$ $N_N$ and a link $N_N$ $N_{N+}$, which lies forward of the link $N_{N-1}$ $N_N$. The link length IN and the intersection angle $\theta_N$ can be geometrically calculated because the positions of the nodes $N_N$ are given as their coordinates.

Then, the curve interval decision means (first decision means) M3 shown in FIG. 2 determines whether the node $N_N$ is present on a curve or a straight road. This decision is made in the following manner. In Step S3, $\theta_N/1_N$ at each node $N_N$ is calculated, and this $\theta_N/1_N$ is compared with a preset first decision reference value $_{REF}$. If $\theta_N/1_N > \phi_{REF}$, it is determined that the node $N_N$ is present on a curve, and the process proceeds to Step S5. $\theta_N/1_N$ corresponds to the azimuth angle change quantity of the vehicle relative to the travel distance of the vehicle, and $\theta_N/1_N$ having a large value indicates that the road is curved, whereas $\theta_N/1_N$ having a small value indicates that the road is a straight road.

If it is determined in Step S3 that $\theta_N/1_N < \phi_{REF}$, the intersection angle $\theta_N$ is compared with a second decision reference value $\theta_{REF}$ in Step S4. If $\theta_N \geq \theta_{REF}$, i.e., the intersection angle $\theta_N$ itself is not less than the second decision reference value $\theta_{REF}$, it is determined that the road is curved, and the process proceeds to Step S5. On the other hand, if it is determined in Step S3 that $\theta_N/1_N < \phi_{REF}$ and it is determined in Step S4 that $\theta_N < \theta_{REF}$, it is determined in Step S15 that the road is a straight road. Incidentally, if the road is a straight road, the passage-state decision quantity $\theta_N/1_N$ to be described later is set to zero.

If, in the curve interval decision means (first decision means) M3, it is determined that the node $N_N$ is present on the curve, second decision means $M4_1$ determines whether two successive nodes $N_N$ and $N_{N+1}$ are present on the same curve. The decision by the second decision means $M4_1$ is performed in the following manner. In Step S5, the link length IN between the nodes $N_N$ and $N_{N+1}$ is compared with a third decision reference value $1_{maxN}$. If $1_N \leq 1_{maxN}$, it is determined that the nodes $N_N$ and $N_{N+1}$ are present on the same curve, and the process proceeds to Step S6. If $1_N > 1_{maxN}$, it is determined that the nodes $N_N$ and $N_{N+1}$ are not present on the same curve, and the process proceeds to Step S10.

Figure 8A:
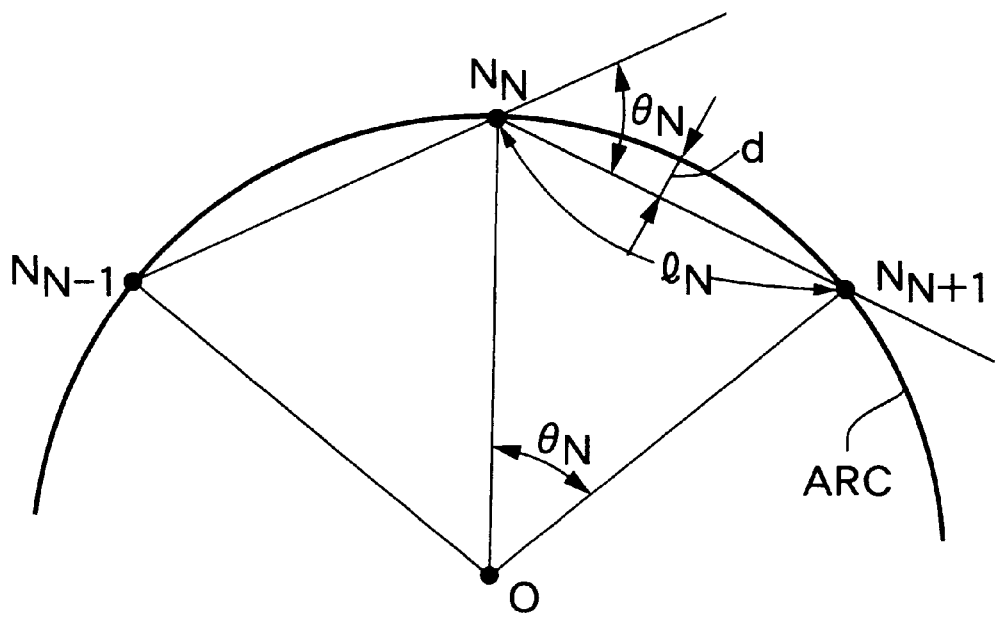
FIGS. 8A and 8B are explanatory views of Step S5 of the flowchart.

The meaning of Step S5 will be described with reference to FIGS. 8A and 8B. FIG. 8A shows a representative example of a general curve, and also shows the state in which three nodes $N_{N-1}$, $N_N$ and $N_{N+1}$ are equidistantly spaced apart from each other on the same arc centered about O. Since the intersection angle $\theta_N$ at the node $N_N$ is equal to the central angle of the arc $\angle N_N ON_{N+1}$, the link length $1_N$ between the nodes N and $N_{N+1}$ is given as:

$$1_N = 2d/\tan(\theta_N/4), \quad (1)$$

where d is a "zag" between the nodes N and $N_{N+1}$. The "zag" d is a value which serves as a reference for setting the distance between adjacent nodes $N_N$ (i.e., the link length $1_N$) when map data on a road is to be created, and the shape of the road is represented by a minimum number of nodes $N_N$ in such a way that the positions of the respective nodes $N_N$ are set so that the "zag" d becomes equal to or smaller than a predetermined value (3.5 m to 6 m). Accordingly, for a sharp curve, the link length $1_N$ between the adjacent nodes $N_N$ becomes small and the nodes $N_N$ are densely disposed, whereas for a gentle curve, the link length $1^N$ between the adjacent nodes $N_N$ becomes large and the nodes $N_N$ are coarsely disposed.

Figure 8B:
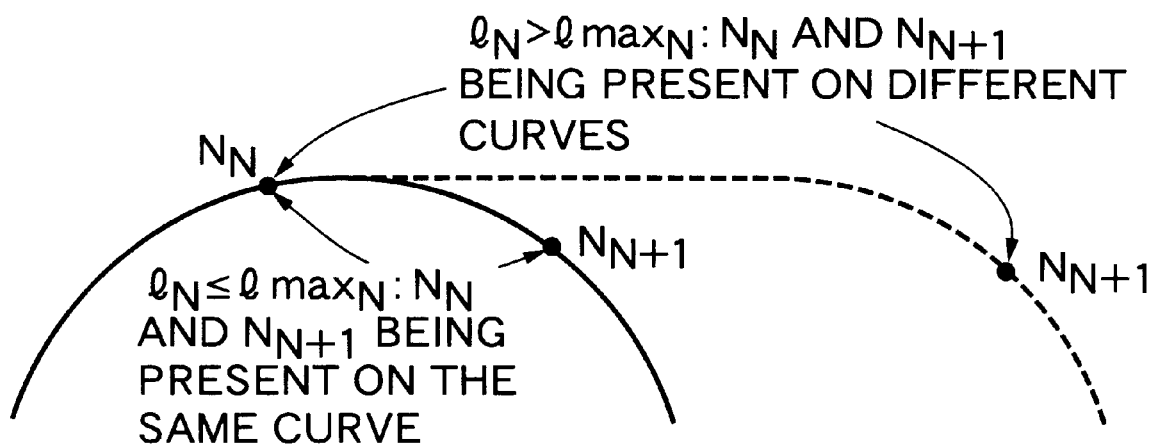

Thus, the third decision reference value $1_{maxN}$ is defined as a maximum link length as follows:

$$1_{maxN} = 2d/\tan(\theta_N/4), \quad (2)$$

and in Step S5, if $1_N \leq 1_{maxN}$ is satisfied, it is determined that the nodes $N_N$ and $N_{N+1}$ are present on the same curve, whereas if $1_N \leq 1_{maxN}$ is not satisfied, it is determined that the nodes $N_N$ and $N_{N+1}$ are present on different curves (refer to FIG. 8B).

If, in the second decision means $M4_1$, it is determined that the nodes $N_N$ and $N_{N+1}$ are present on the same curve, passage-state decision quantities $\theta_1/L_1 \ldots \theta_N/L_N$ of N nodes $N_1 \ldots N_N$ which are present on the same curve are determined in Step S6 by the third decision means $M4_2$ in the following manner. Regarding the first (N−1) nodes $N_1$ to $N_{N31\ 1}$, their passage-state decision quantities $\theta_K/L_K$ (K=1 to N−1) are determined as:

$$\theta_K/L_K \leftarrow \theta_K/I_K \quad (3)$$

Then, the passage-state decision quantity $\theta_N/L_N$ at the last N-th node $N_N$ is determined as:

$$\theta_N/L_N \leftarrow \theta_N/(\text{a shorter value of } 1^{N-i} \text{ or } 1_{maxN}), \quad (4)$$

where $1_{maxN}$ is $1_{maxN} = 2d/\tan(\theta_N/4)$ defined in the above equation (2).

Figure 9A:
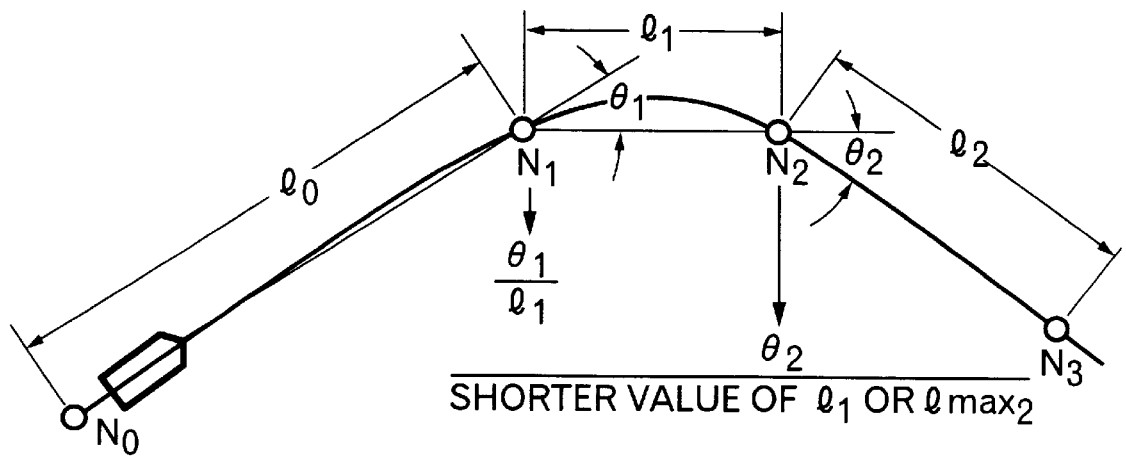
FIGS. 9A, 9B, 9C are explanatory views of the definition of the passage-state decision quantity $\theta_N/L_N$ used in the flowchart.
Figure 9B:
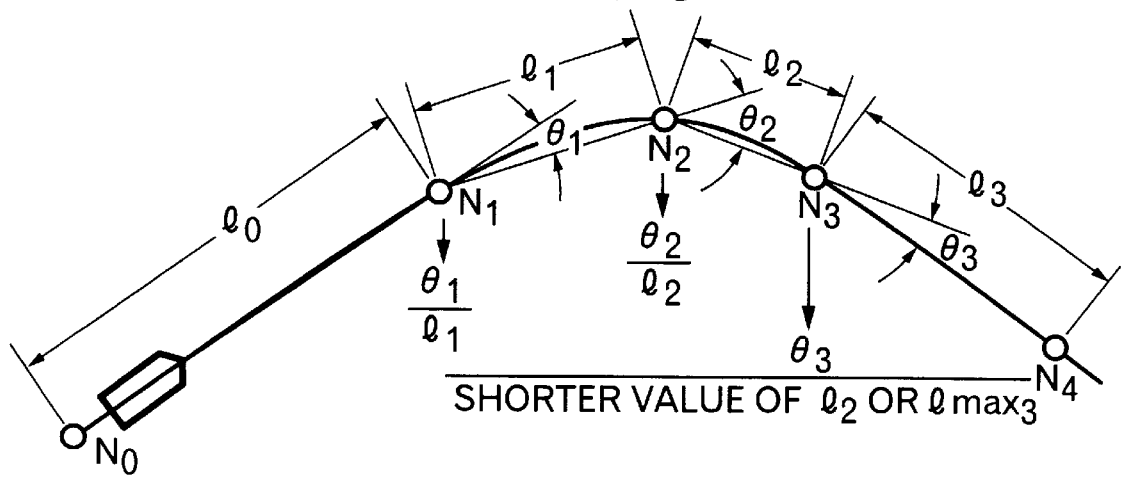
Figure 9C:
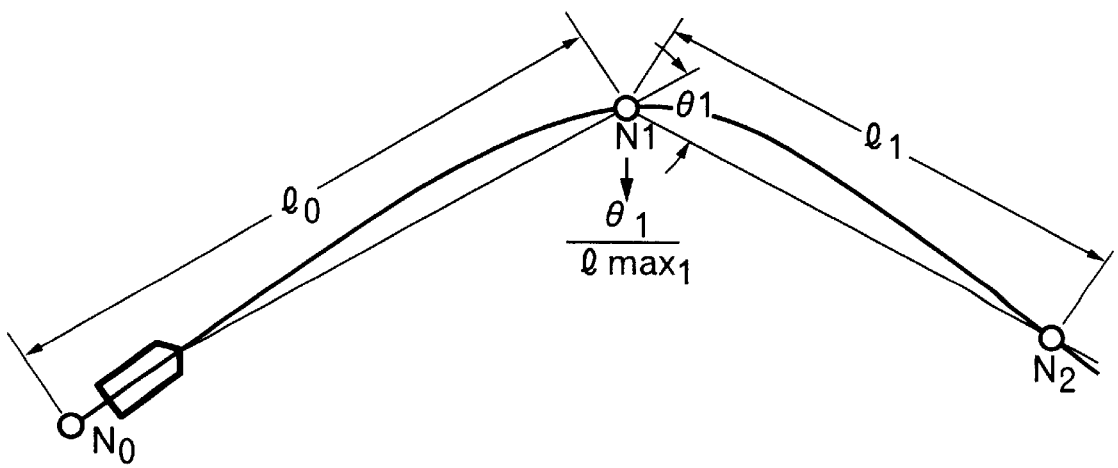

Specifically, as shown in FIG. 9A, if two nodes $N_1$ and $N_2$ are successively present on the same curve, the passage-state decision quantity $\theta_1/L_1$ at the first node $N_1$ is determined as $\theta_1/1_1$ and the passage-state decision quantity $\theta_2/L_2$ at the second (last) node $N_2$ is determined as $\theta_2/(\text{a shorter value of } 1_1 \text{ or } 1_{max2})$. As shown in FIG. 9B, if three nodes $N_1$, $N_2$ and $N_3$ are successively present on the same curve, the passage-state decision quantities $\theta_1/L_1$ and $\theta_2/L_2$ at the first and second nodes $N_1$ and $N_2$ are respectively determined as $\theta_1/1_1$ and $\theta_2/1_2$ and the passage-state decision quantity $\theta_3/L_3$ at the third (last) node $N_3$ is determined as $\theta_3/(\text{a shorter value of } 1_2 \text{ or } 1_{max3})$.

Incidentally, the last node $N_N$ of the plurality of nodes $N_1 \ldots$ which are successively present on the same curve can be determined as a node $N_N$ when the answer in Step S5 has changed from YES to NO.

Then, in Step S7, the direction of the intersection angle $\theta_N$ at the node N is compared with the direction of an intersection angle $\theta_{N+1}$ at the node $N_{N+1}$. If both directions are the same, it is determined in Step S8 that the two nodes $N_N$ and $N_{N+1}$ are present on a simple curve (a curve whose bending direction is constant). If such directions are opposite to each other, it is determined in Step S9 that the two nodes $N_N$ and $N_{N+1}$ are present on an S-shaped curve (a curve whose bending direction changes from right to left or from left to right). On the other hand, if it is determined in the second decision means $M4_1$ (step S5) that the two nodes $N_N$ and $N_{N+1}$ are not present on the same curve, the passage-state decision quantity $\theta_N/L_N$ at the node $N_N$ which is independently present on the same curve is determined as follows in Step S10 by the third decision means $M4_2$ (refer to FIG. 9C):

$$\theta_N/L_N = \theta_N/1_{maxN} \quad (5)$$

Then, in Step S11, a fourth decision reference value $1_{maxN}S$ is calculated by using $L_N$ and $L_{N+1}$ of the above equation (5) as follows:

$$1_{maxN}S = L_N + L_{N+1} \quad (6)$$

The meaning of the fourth decision reference value $1_{maxN}S$ will be described later.

Then, in Step S12, the direction of the intersection angle $\theta_N$ at the node N is compared with the direction of the intersection angle $\theta_{N+1}$ at the node $N_{N+1}$. If both directions are the same, it is determined in Step S14 that the two nodes $N_N$ and $N_{N+1}$ are present on two different curves (which bend in the same direction).

On the other hand, if it is determined in Step S12 that the directions of the intersection angles $\theta_N$ and $\theta_{N+1}$ are opposite to each other, the link length $1_N$ is compared with the fourth decision reference value $1_{maxN}S$ in Step S13. If $1_N < 1_{maxN}S$, it is determined in Step S13 that the two nodes $N_N$ and $N_{N+1}$ are present on the S-shaped curve, whereas if $1_N > 1_{maxN}S$, it is determined in Step S14 that the two nodes $N_N$ and $N_{N+1}$ are present on two different curves (which bend in the opposite directions).

The meaning of Step S13 is as follows. If it is assumed that, as shown in FIG. 10A, the node $N_N$ is present on the first curve of an S-shaped curve consisting of two continuous arcs curved in opposite directions and the node $N_{N+1}$ is present on the second curve of the S-shaped curve, the passage-state decision quantity $\theta_N/L_N$ required for the vehicle to pass the node $N_N$ and a passage-state decision quantity $\theta_{N+1}/L_{N+1}$ required for the vehicle to pass the node $N_{N+1}$ become $\theta_N/1_{maxN}$ and $\theta_{N+1}/1_{maxN+1}$, respectively, from the above equation (5). Accordingly, as shown in FIG. 10B, if the curve is directly continuously followed by the second curve to form an S-shaped curve, the link length $1_N$ between the nodes $N_N$ and $N_{N+1}$ is to be not greater than $1_{maxN} + 1_{maxN+1} = 1_{maxN}S$ Contrarily, if the link length $1_N$ between the nodes $N_N$ and $N_{N+1}$ exceeds $1_{maxN} + 1_{maxN+1} = 1_{maxN}S$, the first curve and the second curve are to be successive different curves separated from each other by a straight line, again with reference to Step S14.

In the above-described manner, the state of the node $N_N$ on the curve is classified as any one of five kinds in any one of the above-described steps S8, S9, S13, S14 and S15, and in the following step S16, the passage-state decision quantity $\theta_N/L_N$ calculated in Step S6 or S10 is corrected by the first correction means M4$_4$ and the second correction means M4$_5$.

First, a correction to be carried out by the first correction means M4$_4$ when a plurality of nodes $N_N$ are present on a simple curve (refer to Step S8) will be described. In this case, the passage-state decision quantity $\theta_N/L_N$ is calculated in Step S6, but even if the value of the calculated passage-state decision quantity $\theta_N/L_N$ is the same, as the total of the intersection angles $\theta_N$ on that curve becomes larger, it becomes more difficult for the vehicle to pass the curve. The reason for this will be understood from the fact that it is more difficult for the vehicle to pass a curve for which the vehicle needs to change its travelling direction by 90° than a curve for which the vehicle needs to change its travelling direction by 30°, even if both curves have the same radius of curvature. Accordingly, as shown in FIG. 11A, the summation $\Sigma\theta_N$ of the intersection angles $\theta_N$ at the plurality of nodes $N_N$ present on the curve is calculated, and a correction coefficient $K_C$ is retrieved from a map by using this $\Sigma\theta^N$ as a parameter. Then, the correction coefficient $K_C$ is used to correct the passage-state decision quantity $\theta_N/L_N$ by the following expression:

$$\theta_N/L_N \leftarrow (\theta_N/L_N) \times (1 + K_C) \quad (7)$$

Since the correction coefficient $K_C$ increase from 0 to 0.5 with an increase in the summation $\Sigma\theta_N$ of the intersection angles $\theta_N$, the corrected passage-state decision quantity $\theta_N/L_N$ becomes a maximum of 1.5 times as large as the original passage-state decision quantity $\theta_N/L_N$. Therefore, the value of the passage-state decision quantity $\theta_N/L_N$ can be adjusted to a value which corresponds to the level of difficulty which the vehicle is to encounter in actually passing the curve.

A correction to be carried out by the second correction means M4$_5$ when two nodes $N_N$, $N_{N+1}$ are present on an S-shaped curve (refer to Steps S9 and S13) will be described. In this case, the passage-state decision quantity $\theta_N/L_N$ is calculated in Step S6 or S10, but even if the value of the calculated passage-state decision quantity $\theta_N/L_N$ is the same, it is more difficult for the vehicle to pass an S-shaped curve than a curve which bends in one direction. Accordingly, as shown in FIG. 11B, the sum $|\theta_N| + |\theta_{N+1}|$ of absolute values of the intersection angles $\theta_N$ and $\theta_{N+1}$ at the two nodes $N_N$ and $N_{N+1}$ is calculated as a parameter and a correction coefficient $K_S$ is retrieved from a map. Then, the correction coefficient Ks is used to correct the passage-state decision quantity $\theta_N/L_N$ by the following expression:

$$\theta_N/L_N \leftarrow (\theta_N/L_N) \times (1 + K_S) \quad (8)$$

Since the correction coefficient $K_S$ increases from 0 to 1.0 with an increase in the sum $|\theta_N| + |\theta_{N-1}|$ of the absolute values of the intersection angles $\theta_N$ and $\theta_{N+1}$, the corrected passage-state decision quantity $\theta_N/L_N$ becomes a maximum of 2.0 times as large as the original passage-state decision quantity $\theta_N/L_N$. Therefore, the value of the passage-state decision quantity $\theta_N/L_N$ can be adjusted to a value which corresponds to the level of difficulty which the vehicle is to encounter in actually passing the S-shaped curve.

Incidentally, the yaw rate YR of the vehicle at the node $N_N$ is given as $\theta_N/t$ which is obtained by dividing the intersection angle $\theta_N$ which is the quantity of a change in the travelling direction of the vehicle by a time t required for the intersection angle $\theta_N$ to occur. Since the time t is given as $1_N/V$ which is obtained by dividing the link length $1_N$ by the vehicle speed V of the vehicle which passes the link length $1_N$, the yaw rate YR is finally calculated as the product of the passage-state decision quantity $\theta_N/L_N$ and the vehicle speed V.

$$YR = \theta_N/t = \theta_N/(1_N/V) = (\theta_N/1_N) \times V \quad (9)$$

On the other hand, the transverse acceleration G of the vehicle is given as the product of the yaw rate YR and the vehicle speed V.

$$G = YR \times V \quad (10)$$

Thus, in Step S17, the following equation is calculated from the above equations (9) and (10):

$$V = \{G/(\theta_N/L_N)\}^{1/2} \quad (11)$$

The above equation (11) shows that if the set limit transverse acceleration G which is allowable when the vehicle is passing the curve is determined, the maximum passable speed $V_{maxN}$ at which the vehicle passes the curve can be obtained on the basis of the set limit transverse acceleration G and the passage-state decision quantity $\theta_N/L_N$. The maximum passable speed $V_{maxN}$ is a maximum vehicle speed at which the vehicle can pass the curve in such a manner that the transverse acceleration of the vehicle does not exceed the set limit transverse acceleration G, and this value is set as the control initiation speed $V_{maxN}i$. Then, in Step S18, the control termination speed $V_{maxN}t$ is retrieved from the map of FIG. 12 on the basis of the control initiation speed $V_{maxN}i$.

Then, in Step S19, the predicted passing speed $V_N$ at which the vehicle passes the node $N_N$ if the vehicle is assumed to start decreasing at the reference deceleration β from the vehicle position P is calculated from:

$$V_N = (V^2 - 2\beta S_N)^{1/2}, \quad (12)$$

where $S_N$ is the distance from the vehicle position P to the node $N_N$.

Then, in Step S20, the predicted passing speed $V_N$ is compared with the control initiation speed $V_{maxN}i$, and if $V_N \leq V_{maxN}i$, it is determined that the vehicle can pass the node $N_N$, whereas if $V_N > V_{maxN}i$, it is determined that the vehicle cannot easily pass the node $N_N$. If the vehicle cannot easily pass the node $N_N$, in Step S21, the warning means M9 is operated for warning the driver to decelerate the vehicle, and the vehicle speed regulating means M10 is operated for automatically decelerating the vehicle. Thus, voluntary braking by the driver and automatic deceleration is carried out to lower the vehicle speed so that the vehicle can securely pass the curve.

The operation of the vehicle control means M12 (the warning means M9 and the vehicle speed regulating means M10) is continued until the predicted passing speed $V_N$ falls below the control termination speed $V_{maxN}t$ in Step S22. If $V_N < V_{maxN}t$ is reached in Step S22, the operation of the vehicle control means M12 is terminated in Step S23.

In this manner, the control initiation speed $V_{maxn}i$ and the control termination speed $V_{maxN}t$ each of which has a different value are set, and the initiation of the operation of the vehicle control means M12 is determined from a comparison between the predicted passing speed $V_N$ and the control initiation speed $V_{maxN}i$, while the termination of the operation of the vehicle control means M12 is determined from a comparison between the predicted passing speed $V_N$ and the control termination speed $V_{maxN}t$. Accordingly, it is possible to surely and reliably prevent occurrence of a chattering in which the vehicle control means M12 repeats an initiation of operation and a termination of operation at short time intervals.

In addition, since the value of the control termination speed $V_{maxN}t$ is set larger than the value of the control initiation speed $V_{maxN}i$, it is possible to prevent a delay of the operation initiation timing of the vehicle control means M12 based on the control initiation speed $V_{maxN}i$, and it is also possible to prevent a delay of the operation termination timing of the vehicle control means M12 on the basis of the control termination speed $V_{maxN}t$. Furthermore, since the control termination speed $V_{maxN}t$ is map-retrieved on the basis of the control initiation speed $V_{maxN}i$, it is possible to prevent an error from occurring in the relative magnitude relation between the control initiation speed $V_{maxN}i$ and the control termination speed $V_{maxN}t$, and it is possible to appropriately associate the operation initiation timing and the operation termination timing of the vehicle control means M12 with each other.

As described above, if it is determined in steps S3 and S4 that the node $N_N$ is present on a curve, the passage-state decision quantity $\theta_N/L_N$ at the node $N_N$ present on the curve is specifically calculated. Accordingly, computational load is reduced by avoiding calculating the passage-state decision quantity $\theta_N/L_N$ which is not necessary for the vehicle when it is running on a straight road, whereby it is possible to reduce the size of an electronic control unit. In addition, the passage-state decision quantity $\theta_N/L_N$ which is a parameter which appropriately represents the level of difficulty which the vehicle is to encounter in passing the node is used to determine whether the vehicle can pass the curve. Thus, even if only one or two nodes $N_N$ are present on a curve, it is still possible to accurately determine whether the vehicle can pass the curve.

Although the present invention has been described above in detail relative to the presently preferred embodiments, various design changes can be made without departing from the scope of the present invention.

For example, although in each of the embodiments the maximum passable speed $V_{maxN}$ is calculated on the basis of the set limit transverse acceleration G, it is also possible to calculate the maximum passable speed $V_{maxN}$ on the basis of the set limit yaw rate YR, instead of the set limit transverse acceleration G. Specifically, the maximum passable speed $V_{maxN}$ may also be calculated from the above equation (9) as follows:

$$V_{maxN} = YR / (\theta_N / L_N) \quad (13)$$

The scope of the invention is indicated by the appended claims, rather than by the foregoing discussion of presently preferred embodiments.

We claim:

1. A vehicle control apparatus comprising:

map information output means for outputting map information containing a group of nodes which constitute a road;

vehicle position detecting means for detecting a vehicle position on a map;

road shape decision means for determining a road shape based on an arrangement of ones of said nodes forward of the vehicle position;

maximum passable speed calculating means for calculating a maximum passable speed for each of said ones of said nodes based on the determined road shape;

vehicle speed detecting means for detecting a vehicle speed;

predicted passing speed calculating means for calculating a predicted passing speed for each of said ones of said nodes based on the detected vehicle speed;

passage-possible/impossible determining means for comparing the predicted passing speed with the maximum passable speed and determining whether the vehicle can safely pass each of said ones of said nodes; and vehicle control means for controlling the vehicle based on a result determined by said passage-possible/impossible determining means;

the maximum passable speed including a control initiation speed and a control termination speed at least as large as the control initiation speed, and said passage-possible/impossible determining means initiates an operation of said vehicle control means if the predicted passing speed exceeds the control initiation speed, and terminates the operation of said vehicle control means if the predicted passing speed falls below the control termination speed.

2. A vehicle control apparatus according to claim 1, wherein the control termination speed is determined based on the control initiation speed.

3. A vehicle control apparatus according to claim 1, wherein said control termination speed is larger than said control initiation speed.

4. A vehicle control apparatus according to claim 1, wherein said control termination speed is larger than said control initiation speed for values of the control initiation speed in low and middle regions thereof.

5. A vehicle control apparatus according to claim 1, wherein said control initiation speed is determined by said maximum passable speed calculating means as a maximum passable speed at which the vehicle does not exceed a set limit lateral dynamic condition.

6. A vehicle control apparatus according to claim 5, wherein said set limit lateral dynamic condition is a set limit transverse acceleration.

7. A vehicle control apparatus according to claim 5, wherein said control termination speed is determined based on said control initiation speed.

8. A vehicle control apparatus according to claim 3, wherein said control termination speed is determined based on said control initiation speed.

9. A vehicle control apparatus comprising:
- means for outputting map information which contains a plurality of nodes constituting a road;
- means for detecting a vehicle position on a map;
- means for determining a road shape based on an arrangement of ones of the nodes forward of the detected vehicle position;
- means for calculating a maximum passable speed for each of the ones of the nodes based on the determined road shape;
- means for detecting a vehicle speed;
- means for calculating a predicted passing speed for each of said ones of said nodes based on the detected vehicle speed;
- passability determining means for comparing the predicted passing speed with the maximum passable speed and determining whether the vehicle can safely pass each of the ones of said nodes; and
- means for controlling the vehicle based on an output of said passability determining means;

said control means initiates a vehicle control operation when said predicted passing speed exceeds said maximum passable speed, and terminates said vehicle control operation when said predicted passing speed falls below a control termination speed at least as large as said maximum passable speed so as to prevent a chattering of the control means when said predicted passing speed varies across said maximum passable speed in a short time interval.

10. A vehicle control apparatus according to claim 9, wherein said control termination speed is larger than said maximum passable speed.

11. A vehicle control apparatus according to claim 9, wherein said control termination speed is determined based on said maximum passable speed.

12. A vehicle control apparatus according to claim 9, wherein said control termination speed is larger than said maximum passable speed in low and middle regions thereof.

13. A vehicle control apparatus according to claim 9, wherein said maximum passable speed is determined by said maximum passable speed calculating means as a maximum passable speed at which the vehicle does not exceed a set limit lateral dynamic condition.

14. A vehicle control apparatus according to claim 13, wherein said set limit lateral dynamic condition is a set limit transverse acceleration.

15. A vehicle control apparatus according to claim 13, wherein said control termination speed is determined based on said maximum passable speed.

* * * * *

UNITED STATES PATENT AND TRADEMARK OFFICE
CERTIFICATE OF CORRECTION

PATENT NO. : 6,125,324
DATED : September 26, 2000
INVENTOR(S) : Shohei Matsuda, Makoto Otabe and Yuji Sakaki It is certified that error appears in the above-identified patent and that said Letters Patent is hereby corrected as shown below:

Title page,
Item [56], References Cited, U.S. PATENT DOCUMENTS, "5,539,397", change "Asanauma" to -- Asanuma --;
FOREIGN PATENT DOCUMENTS, "19543551" change "United Kingdom" to -- Germany --.

Column 2,
Line 30, change "salient advantages" to -- salient features --;
Line 47, change "$\mathbf{1}_N$" to -- $l_N$ --.

Column 3,
Line 11, change "$\mathbf{1}_N$" to -- $l_N$ --.

Column 5,
Lines 1 and 3, change "$\mathbf{1}_N$" to -- $l_N$ --.
Line 6, change "$N_N\ N_{N+},$" to -- $N_N\ N_{N+1}$ --;
Line 7, change "IN" to -- $l_N$ --;
Line 15, change "value $_{REF}$" to -- value $\psi_{REF}$ --; change "$> \phi_{REF}$" to -- $\geq \psi_{REF}$ --;
Lines 22 and 28, change "$\phi_{REF}$" to -- $\psi_{REF}$ --;
Line 31, change "$\theta_N/l_N$" to -- $\theta_N/L_N$ --;
Line 39, change "IN" to -- $l_N$ --;
Line 57, begin a new paragraph with -- The "zag" --;
Lines 59 and 65, change "$\mathbf{1}_N$" to -- $l_N$ --;
Line 67, change "$\mathbf{1}^N$" to -- $l_N$ --.

Column 6,
Line 6, change "$\mathbf{1}_N$" to -- $l_N$ --;
Line 19, change "$N_{N311}$" to -- $N_{N-1}$ --;
Line 22, (Equation (3)), change "$\theta_K/I_K$" to -- $\theta_K/I_K$ --;
Line 27, (Equation (4)), change "$1^{N-1}$" to -- $I_{N-1}$ --;
Line 29, change "$_=2d$" to -- $= 2d$ --;
Line 34, change "$\theta_1/\mathbf{1}_1$" to -- $\theta_1/I_1$ --;
Line 40, change "$\mathbf{1}_1$" to -- $l_1$ --; change "$\mathbf{1}_2$" to -- $l_2$ --;
Line 42, change "$\mathbf{1}_2$" to -- $l_2$ --;
Line 57, change "step S5" to -- Step S5 --.

UNITED STATES PATENT AND TRADEMARK OFFICE
CERTIFICATE OF CORRECTION

PATENT NO.     : 6,125,324
DATED          : September 26, 2000
INVENTOR(S)    : Shohei Matsuda, Makoto Otabe and Yuji Sakaki It is certified that error appears in the above-identified patent and that said Letters Patent is hereby corrected as shown below:

Column 7,
Line 12, change "$1_N$" to -- $l_N$ --;
Line 13, change "<" to -- $\leq$ --;
Line 30, change "if the curve" to -- if the first curve --;
Line 31, change "$1_N$" to -- $l_N$ --;
Line 33, after "$l_{maxN}S$" insert a period; change "$1_N$" to -- $l_N$ --;
Line 60, change "$\Sigma\theta^N$" to -- $\Sigma\theta_N$ --;
Line 66, change "increase from" to -- increases from --.

Column 8,
Line 35, change "$\theta_N$ which" to -- $\theta_N$, which --;
Line 36, after "vehicle" insert a comma;
Line 38, change "$1_N$" (both occurrences) to -- $l_N$ --;
Line 40, change "$1_N$" to -- $l_N$ --.

Column 9,
Line 27, change "$V_{maxn}i$" to -- $V_{maxN}i$ --;
Line 28, before "each" insert a comma;
Line 29, after "value" insert a comma.

Signed and Sealed this

Eighteenth Day of November, 2003

JAMES E. ROGAN
*Director of the United States Patent and Trademark Office*